United States Patent [19]
Daikoku

[11] Patent Number: 4,854,672
[45] Date of Patent: Aug. 8, 1989

[54] OPTICAL SYSTEM FOR COPIER

[75] Inventor: Akihiro Daikoku, Nara, Japan

[73] Assignee: Sharp Kabushiki Kaisha, Osaka, Japan

[21] Appl. No.: 142,682

[22] Filed: Jan. 11, 1988

[30] Foreign Application Priority Data

Jan. 20, 1987 [JP] Japan .................................. 62-10908
Jan. 20, 1987 [JP] Japan .................................. 62-10909

[51] Int. Cl.[4] .......................... G02B 7/04; G03B 27/36
[52] U.S. Cl. .................................... 350/255; 350/247; 350/252; 355/57; 355/58
[58] Field of Search ........................ 350/255, 247, 252; 355/55, 57, 58, 60

[56] References Cited

U.S. PATENT DOCUMENTS 4,397,544 8/1983 Yajima et al. .......................... 355/58
4,459,017 7/1984 Miura .................................... 355/58
4,571,064 2/1986 Hayashi et al. ........................ 355/57
4,580,891 4/1986 Fukunaga et al. .................... 355/57
4,614,424 9/1986 Endo et al. ........................... 355/58

*Primary Examiner*—Bruce Y. Arnold
*Assistant Examiner*—Martin Lerner
*Attorney, Agent, or Firm*—Flehr, Hohbach, Test, Albritton & Herbert

[57] ABSTRACT

An optical system for a copier includes a lens and mirrors which are movable simultaneously such that an image of an original can be projected on a recording medium at a selected magnification. A cylindrical cam is rotated by a motor which also moves the lens and the cylindrical cam has a guide piece formed on its side surface such that a holder for the mirrors is driven by the rotation of the cam in such a way that the desired magnification is achieved. The holder has two rollers sandwiching the guide piece and compressed against its side surfaces by a spring such that the mirrors can be accurately moved in coordination with the motion of the lens according to the selected magnification.

8 Claims, 2 Drawing Sheets

FIG. — I

OPTICAL SYSTEM FOR COPIER

BACKGROUND OF THE INVENTION

This invention relates to an optical system for a copier with variable magnification capability and more particularly to such an optical system for projecting on a recording medium an image of an original document at a selected magnification by using a lens having a fixed focal length.

An optical system including many mirrors and a lens is used by an electrophotographic copier to form an image of a document on a recording medium such as a photosensitive body with a photoconductive surface. Such an optical system arranges its mirrors and lens in such a way that the optical path length a between the document surface and the lens is equal to the optical path length b between the lens and the image-forming surface of the recording medium when no magnification is desired (or magnification $=1$). If the lens has a fixed focal length denoted by f, the optical path lengths a and b are set such that $a=b=2f$. This is because a and b are related by the well-known lens formula $f=ab/(a+b)$ and since magnification m is defined by b/a and hence $a=b$ if the magnification is 1, the lens formula provides $f=a/2=b/2$ in this situation.

If it is desired to form an enlarged image on the recording medium or that m be greater than 1, this is achieved by moving the lens closer to the document surface and if reduction in size is desired it is likewise achieved by moving the lens closer to the recording medium. In other words, the lens must be moved to vary the magnification and, in addition, the mirrors disposed in the optical path must also be moved simultaneously in order to adjust the total optical path length $(a+b)$ corresponding to the selected magnification. In prior art optical systems, the lens and the mirrors are adapted to move in coordination with respect to each other according to the variable magnification. Mechanisms for moving the lens and the mirrors according to the selected magnification are generally very complicated and occupy a large space. Some systems use independent driving units for the lens and the mirrors but not only are such systems costly but each driving unit must also be accurately driven in coordination according to the magnification. Japanese Patent Publication Koho No. 59-69749 entitled "Optical System for Electrophotographic Copier" disclosed a system using a single driver unit with which a lens and mirrors are moved together according to the selected magnification. In this system, the lens is moved to change the magnification by using a wire driven by a motor while the mirrors are moved by a planar cam connected to the same motor by means of a connector. If the range in which the magnification is variable is large, however, the planar cam and the like becomes complicated in structure and large in size. Thus, this technology can be applicable only to systems for which the magnification is not varied widely.

SUMMARY OF THE INVENTION

It is therefore an object of the present invention to provide a simply structured optical system for a copier using a lens with a fixed focal length.

It is another object of the present invention to provide such an optical system using a single driving means to move both its lens and mirrors.

It is a further object of the present invention to provide an improved means for moving mirrors in such an optical system accurately according to the selected magnification.

An optical system embodying the present invention with which the above and other objects are achieved comprises a cylindrical cam which is rotatable by a motor or the like and a mirror holder which supports mirrors and is connected in a motion-communicating relationship with the cam. The motive force which drives the cam is also used to move a lens holder supporting the lens. A guide piece is formed on the side surface of the cylindrical cam according to the lens formula. Rollers are disposed so as to sandwich the guide piece from both sides and to be compressed against the guide piece such that the mirrors can be accurately moved to correct positions.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
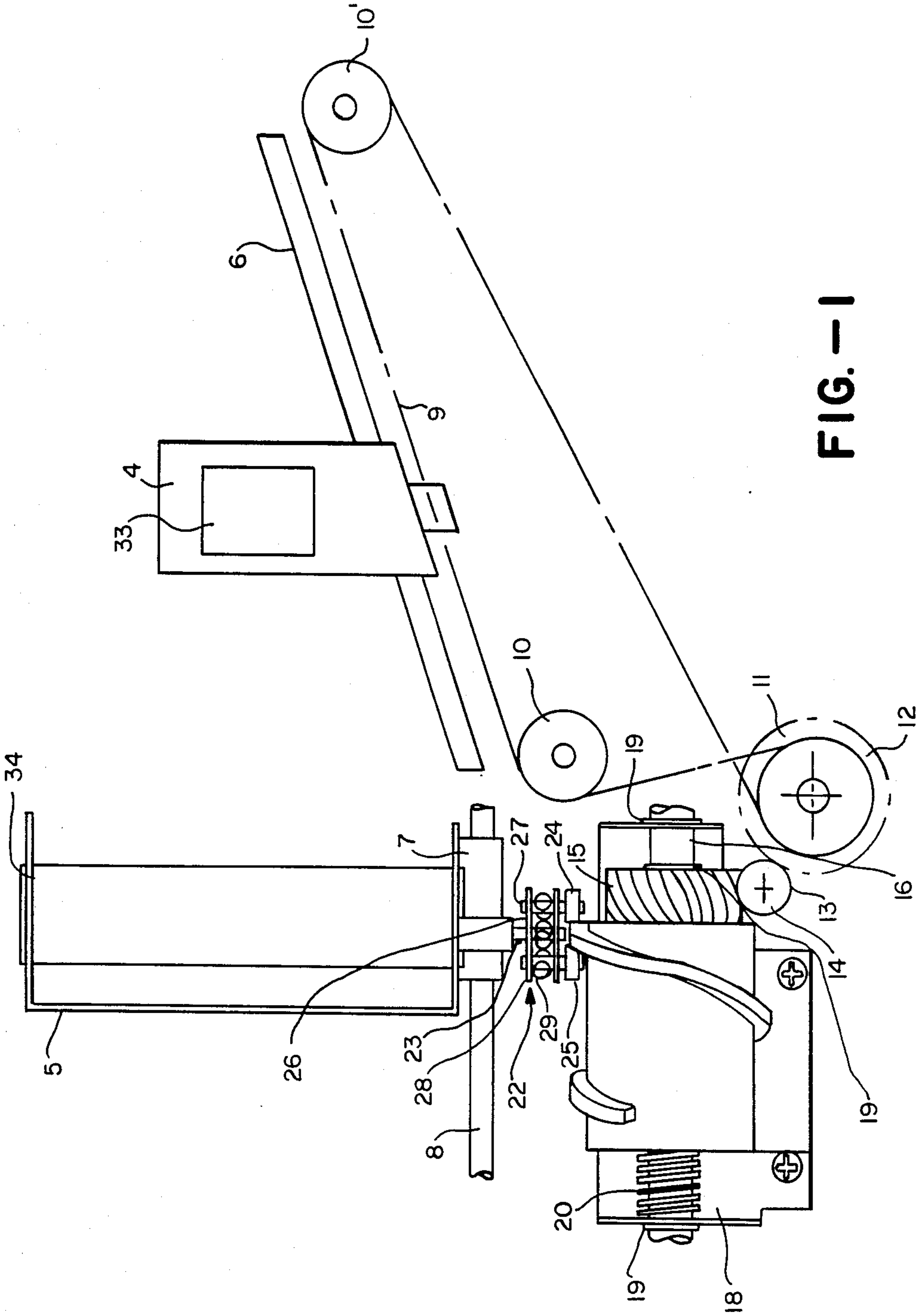
FIG. 1 is a plan view of a mechanism for moving a lens and mirrors of an optical system embodying the present invention.
Figure 2:
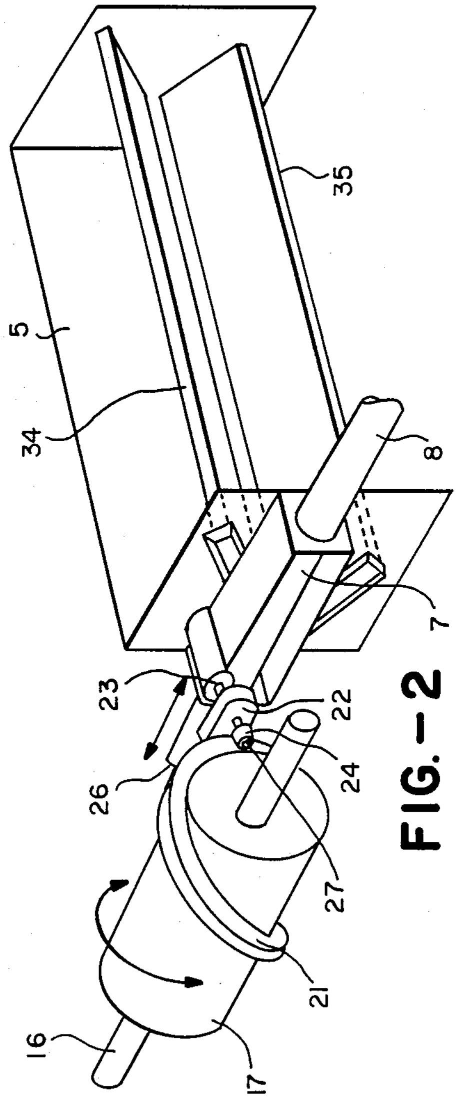
FIG. 2 is a diagonal view of a part of the mechanism of FIG. 1 related to the motion of the mirrors.
Figure 3:
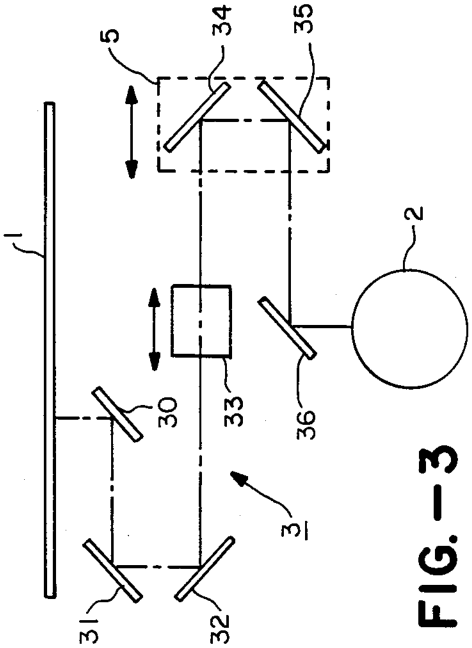
FIG. 3 is a side view schematically showing the overall structure of the optical system of FIG. 1.

An optical system embodying the present invention for a copier and in particular its mechanism for moving its lens and mirrors is described with reference to FIGS. 1, 2 and 3. With reference first to FIG. 3, numeral 1 indicates an original document to be copied, numeral 2 indicates a cylindrical recording medium upon which the image of the original 1 is projected and numeral 3 generally indicates the optical system which is disposed between the original document 1 and the recording medium 2 and serves to project the optical image of the original 1. The optical system 3 includes, for example, a first mirror 30 for reflecting light from the original 1, a second mirror 31 and a third mirror 32 for reversing the optical path of the reflected light from the first mirror 30, a projection lens 33 with a fixed focal length f, a fourth mirror 34 and a fifth mirror 35 for reversing the optical path of the light passing through the lens 33, and a fixed mirror 36 for directing the reflected light from the fifth mirror 35 in the direction of the recording medium 2. In order to optically scan the entire length of the original 1, the optical system 3 is so structured that not only is the original 1 itself movable but also the first mirror 30 and the second and third mirrors 31 and 32 are moved with respect and parallel to the fixed original 1 at speeds of v and v/2, respectively. The speed v is variable, depending on the selected magnification. If $v_m$ represents the value of v when the selected magnification is m, $v_m=v/m$.

The optical system 3 is also so structured that the lens 33 and the fourth and fifth mirrors 34 and 35 are moved in the directions of the arrows according to the magnification. The lens 33 is securely supported by a lens holder 4 as shown in FIG. 1 and the fourth and fifth mirrors 34 and 35 are likewise supported by a single mirror holder 5 as shown in FIGS. 2 and 3. The lens holder 4 is slidably supported on a lens holder guide rail 6 so as to be slidable therealong and the mirror holder 5 is slidably supported through a sliding member 7 on a mirror holder rail 8 so as to be slidable therealong.

The lens and mirror holders 4 and 5 are further made movable adjustably according to the desired magnification. A wire 9 is affixed to the lens holder 4 and is stretched over three rotatably disposed pulleys 10, 10' and 11. The third pulley 11 has a gear wheel 12 affixed coaxially thereonto. This gear wheel 12 is engaged with another gear wheel 13 directly attached to the drive shaft of a motor (not shown) such that the driving force of this motor is communicated to the wire 9. The lens holder guide rail 6 is sloped because one side of the original 1 is used as a reference for projection onto the recording medium 2.

In order to move the mirrors 34 and 35 in coordination with the lens 33, a pinion gear 14 is additionally affixed to the drive shaft of the aforementioned motor together with the gear wheel 13 and a rack gear 15 is provided to engage with this pinion gear 14. The rack gear 15 is rotatably supported around a shaft 16 and a cylindrical cam 17 is affixed to this shaft 16 so as to rotate together with the rack gear 15. The rack 15 and the cylindrical cam 17 are either fastened together or unistructurally formed such that the rotary power of the motor can be directly communicated to the cylindrical cam 17 without the necessity for any intermediate power-communicating means. This is to be contrasted with conventional optical systems which generally make use of a power-transmitting means between the motor and the cam such that the rotation of the motor cannot be accurately communicated because of loose connection or the like. With the cam 17 fastened to or unistructurally formed with the rack gear 15, the cam 17 can be rotated accurately by the motor according to the present invention.

The shaft 16 for rotatably supporting the cam 17 and the rack gear 15 therearound is affixed to a cam holder 18. E-rings 19 are affixed to the ends of the shaft 16 to prevent the cam holder 18 from dropping off. One of these E-rings 19 (on the left-hand side in FIG. 1) serves to position the cam 17. A spring 20 is provided between the cam 17 and the cam holder 18 such that its biasing force tends to prevent the rack gear 15 from sliding along the shaft 16 beyond a certain limit. A guide piece 21 is spiralingly formed on the side surface of the cylindrical cam 17 such that the mirror holder 5 can be moved properly according to the selected magnification. In other words, since the lens formula is well known, the appropriate positions of the mirrors 34 and 35 can be easily calculated as a function of magnification m. When there is no magnification (or m=1), $a=b=2f$ and hence the total optical path length L between the original 1 and the recording medium 2 is $L=a+b=4f$. When m is not equal to 1, one obtains from the lens formula that $a=(1+m)f/m$ and $b=(1+m)f$ and hence the total optical path length $L_m$ in this situation is given by $L_m=a+b=(1+m)^2f/m$. In other words, the mirror holder 5 is adapted to move as a function of magnification m according to the formula given above. Since both the fourth and fifth mirrors 34 and 35 are simultaneously moved and the total optical path length is changed twice as fast as the position of the mirror holder 5, the distance x by which the mirror holder 5 should be moved from the position set for the no-magnification condition is given by $x=(L_m-L)/2=(1-m)^2f/2m$.

Figure 4:
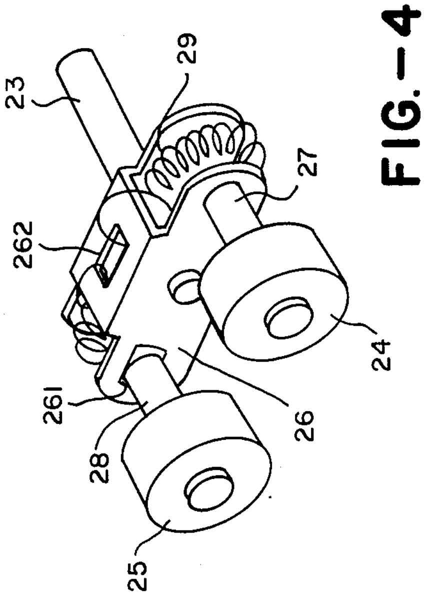
FIG. 4 is a diagonal view of a mechanism in the optical system of FIG. 1.

In order to control the motion of the mirror holder 5 according to the selected magnification, the sliding member 7 affixed to the mirror holder 5 is provided with a guide follower 22 such that the mirror holder 5 can be moved according to the position of the guide piece 21 spiraling around the cylindrical cam 17 as explained above. As shown in detail in FIG. 4, the guide follower 22 comprises compression rollers 24 and 25 and a roller holder 26 for supporting the compression rollers 24 and 25. The roller holder 26 is rotatably attached to one end of a shaft 23 of which the other end is affixed to the sliding member 7. The roller 24 is rotatably supported by a shaft 27 affixed to the roller holder 26. The other roller 25 is rotatably supported by another shaft 28 which is at some distance away from and is made movable toward the first shaft 27. For this purpose, the roller holder 26 is provided with a hole 261 which is elongated in the direction of the shaft 27 such that the shaft 28 which passes through this hole 261 can be moved somewhat in the direction of this elongation. A spring 29 is provided to apply a biasing force on the shaft 28 in the direction of the shaft 27. The ends of this spring 29 are attached to opposite sides of another opening 262 provided to the roller holder 26. Since the rollers 24 and 25 at the ends of the shafts 27 and 28 are so disposed as to sandwich therebetween the guide piece 21 of the cylindrical cam 17 and the spring 29 serves to cause the guide piece 21 to be compressed from both sides with an appropriate pressure, and since the shaft 27 is firmly secured to the roller holder 26, the mirror holder 5 can be moved accurately according to the lens formula by following the guide piece 21 as the cylindrical cam 17 is rotated by the force communicated through the rack gear 15.

With an optical system thus structured, the motor is rotated either in the positive or negative direction to move the lens and mirrors according to the selected magnification m, the angle of rotation being determined by the selected magnification m. As the motor is rotated, the wire 9 is driven and the lens holder 4, and hence the lens 33, is moved by a distance y determined by m, or $y=f(1-m)$. If reduction is desired, for example, the lens 33 is moved to the right with respect to FIG. 3. If an enlarged copy is desired, on the other hand, m is greater than 1 and y becomes negative, that is, the lens 33 is moved to the left. It should be noted that the aforementioned distance y changes linearly with magnification m.

As the lens 33 is thus moved according to the selected magnification m, the fourth and fifth mirrors 34 and 35 are moved correspondingly. Since this is effected by the rotation of the cylindrical cam 17 caused by direct transmission of the power of the motor to the rack gear 15, the structure of the optical system is extremely simplified. Moreover, since the mirrors 34 and 35 are moved by the rotation of the cam 17, magnification m can be varied over a relatively large range merely by designing the shape of the guide piece 21 properly. Furthermore, the shape of the cam 17 as a whole need not be complex and the cam 17 need not be made larger.

As the cam 17 is rotated and hence the mirrors are moved, the slope of the guide piece 21 changes corresponding to the magnification m, but the rollers 24 and 25 are always compressed against the guide piece 21 in the same manner. This is because the roller holder 26 to which the rollers 24 and 25 are attached is rotatable around the shaft 23. Since the distance between a side surface of the guide piece 21 and the shaft 27 of the roller 24 is invariably fixed, the mirrors 34 and 35 can always be moved to a correct position. In particular, since the side surface of the guide piece 21 onto which the roller 24 is compressed is accurately formed according to the lens formula and since the shaft 27 is firmly positioned with respect to the roller holder 26, the motion of the mirrors 34 and 35 can be controlled very accurately.

The foregoing description of a preferred embodiment of the invention has been presented for purposes of illustration and description. It is not intended to be exhaustive or to limit the invention to the precise form disclosed, and many modifications and variations are possible in light of the above teaching. For example, although FIG. 1 described an embodiment according to which mirrors are moved simultaneously by the same driving means (i.e., a motor) which drives the lens 33, a separate driving means may be provided for driving the mirrors within the scope of the present invention. In summary, the present invention is effective whenever mirrors are moved by means of a cylindrical cam. Alternatively, the mirrors may be caused to move as a second-order (binomial) function of magnification. Any modifications and variations that may be apparent to a person skilled in the art are intended to be included within the scope of this invention.

What is claimed is:

1. In an optical system for a copier for projecting an image of an original on a recording medium, said optical system including a lens with a fixed focal length adapted to be moved according to a selected magnification, and mirrors adapted to be moved simultaneously along a light path within said optical system, the improvement wherein said optical system further comprises

- a power source which causes said lens to move,
- a cylindrical cam adapted to be rotated by said power source,
- guide means having two opposite side surfaces and formed on said cylindrical cam, and
- a mechanism having a holder rotatably supported and connected to said mirrors, two compressing members attached to said holder for engagingly sandwiching said guide means therebetween and being compressed on said two side surfaces, and a biasing means for applying a biasing force on said compressing members to compress said side surfaces of said guide means, said mechanism being adapted to move said mirrors along said light path within said optical system controlled by said guide means, said guide means being so shaped that said mechanism moves said mirrors to maintain an appropriate optical path length between said original and said recording medium according to said selected magnification.

2. The optical system of claim 1 wherein said power source communicates motion to said cylindrical cam through transmission means which is either directly attached to or unistructurally formed with said cylindrical cam.

3. The optical system of claim 2 wherein said power source is a motor and said transmission means include a rack gear engaging with a pinion affixed to the drive shaft of said motor.

4. The optical system of claim 1 wherein said guide means is a protrusion formed helically on the side surface of said cylindrical cam.

5. The optical system of claim 1 wherein one of said side surfaces is so shaped that said selected magnification is realized.

6. The optical system of claim 5 wherein one of said compressing means adapted to be compressed against said one of said side surfaces is securely positioned with respect to said holder and the other of said compressing members is supported movably with respect to said holder.

7. The optical system of claim 5 wherein said compressing members comprise rollers supported rotatably by said holder.

8. The optical system of claim 1 wherein said compressing members comprise rollers supported rotatably by said holder.

* * * * *